Figure 1:
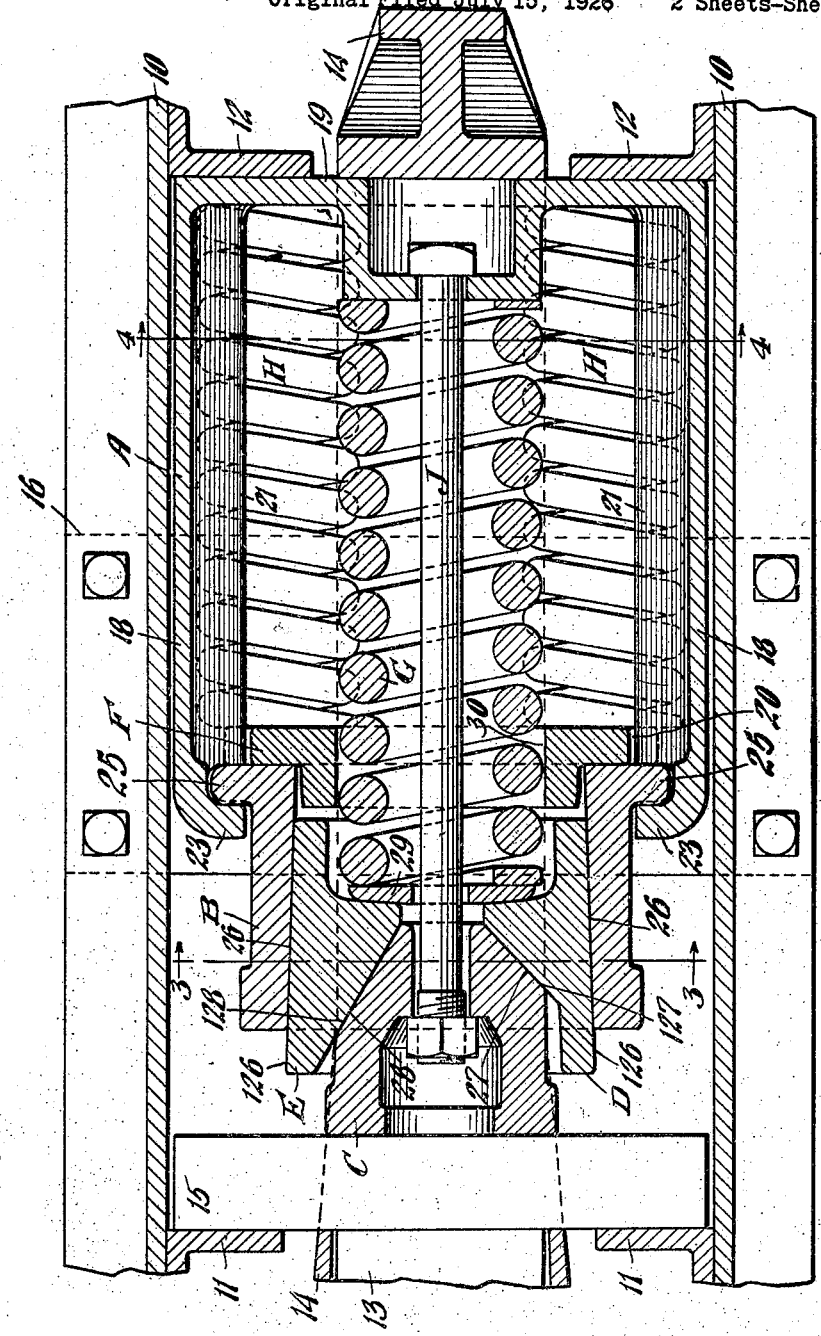

Sept. 4, 1928.　　　　　　　　　　　　　　　　　　1,683,473
G. Q. LEWIS
FRICTION SHOCK ABSORBING MECHANISM
Original Filed July 15, 1926　　2 Sheets-Sheet 1

Witness

Inventor
Goodrich Q. Lewis
By George I. Haight
His Atty.

Sept. 4, 1928.
G. Q. LEWIS
1,683,473
FRICTION SHOCK ABSORBING MECHANISM
Original Filed July 15, 1926  2 Sheets-Sheet 2
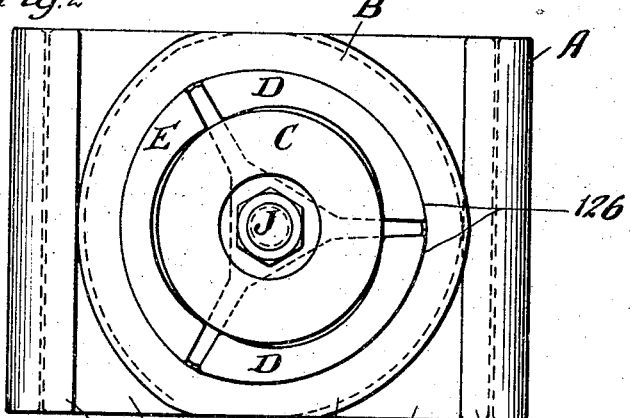
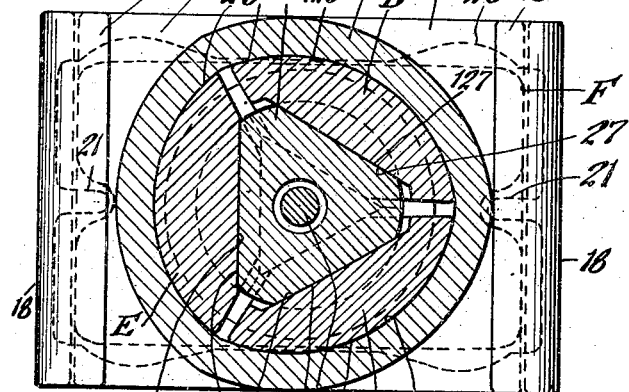
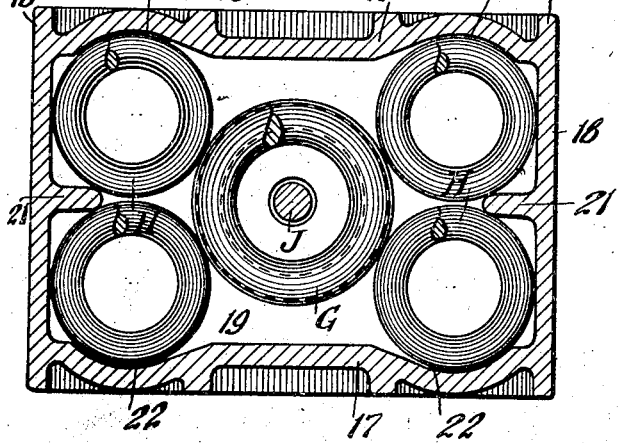
Witness
Wm. Geiger
Inventor
Goodrich Q. Lewis
By George I. Haight
His Atty.

Patented Sept. 4, 1928.

1,683,473

UNITED STATES PATENT OFFICE.

GOODRICH Q. LEWIS, OF WHEATON, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 15, 1926, Serial No. 122,541. Renewed December 17, 1927.

This invention relates to improvements in friction shock absorbing mechanisms.

As is well known to those skilled in the art of railway draft riggings, the space within which the shock absorbing mechanism proper is accommodated is very strictly limited by rules and regulations of standardization and that shock absorbing mechanisms therefore cannot exceed a certain length, height and width. Notwithstanding the restricted space allowed for shock absorbing mechanisms for railway draft riggings, manufacturers are compelled to provide shock absorbing mechanisms which must stand more severe service conditions from year to year. Service conditions have become very much more severe as compared with those of a few years ago, due to the constant increase in size of cars, the increase in load per car, the general increase in length of trains, and the increase in tractive effort and speed of locomotives. In meeting the conditions imposed by gradually changing service requirements, manufacturers have resorted to shock absorbing mechanisms of the friction type. In order to attain the necessary high capacity, such a mechanism must have high spring as well as high friction resistance. In other words, the gear must be so designed as to provide the maximum spring space consistent with good practice. Heretofore this has been accomplished by the twin arrangement of springs wherein the springs co-operate with a friction system co-operating with a friction shell. In gears of this type, it has been the practice to detachably connect the friction shell to the spring cage in which the twin springs are housed, the inner end of the shell being provided with lateral flanges engaging within grooves on the spring cage proper. This arrangement, however, does not provide a sufficiently great column strength to successfully withstand the hard usage to which the gear is frequently subjected in service, because the spring cage is weakened due to having the side walls thereof left open for a considerable distance to permit insertion of the springs within the cage and at the same time provide sufficient space to accommodate springs of the relatively large diameter required.

Attempts have been made to overcome this deficiency in column strength by making the side walls of the spring cage continuous and inserting the twin springs from the front end of the cage, but on account of the available spring space being reduced to the extent of the thickness of the side walls of the cage, the size of the twin springs is correspondingly reduced with a consequent sacrifice in shock absorbing capacity of the gear. In other words, twin springs of sufficient capacity cannot be employed with a cage having closed side walls and therefore the cage with partly open side walls has been almost universally employed with the twin spring arrangement of friction gear. As pointed out, the twin spring arrangement with the spring cage having open side walls materially reduces the column strength of the gear, with the result that there is a tendency of the side walls of the cage to bow out and the front end walls to bow inwardly when the gear is subjected to heavy loads, thereby weakening the support for the inner end of the friction shell to such an extent that the inner end of the shell is subjected to a beam action and in addition insufficient resistance is offered to the natural tension set up by the radial expansion of the friction system, thereby overloading the metal at the rear end of the shell to such an extent that the shell is damaged.

It is the principal object of this invention to overcome the defects pointed out without sacrificing high spring capacity, by providing in combination with a spring cage of ample column strength an arrangement of spring resistance means having at least the capacity characteristic of the twin spring arrangement referred to.

A more specific object of the invention is to provide a friction shock absorbing mechanism especially adapted for railway draft riggings, including a spring cage, a detachable friction shell, and spring resistance means within the cage cooperating with the friction system, wherein the spring cage is open at one end only and all the walls thereof are substantially solid to provide great column strength, and the spring resistance means is so designed and arranged as to occupy the maximum portion of the available spring space, thereby obtaining exceptionally hight spring capacity.

A further object of the invention is to provide a friction shock absorbing mechanism of the character indicated, including a spring cage casting, open at one end only and having all the walls thereof solid and housing a spring resistance means composed of a centrally arranged relatively heavy spring element and four relatively lighter spring elements disposed in pairs at opposite sides of the mechanism; a friction shell detachably connected to the cage; a friction system co-operating with the shell; and a spring follower co-operating with the outer springs, the follower being provided with an opening through which the central spring extends, the central spring directly co-operating with the friction system.

Yet another object of the invention is to provide a friction shock absorbing mechanism of the character indicated, including a spring cage having all the walls thereof solid to provide great column strength; and a friction shell detachably connected to the cage, wherein the cage and shell are provided with relatively large co-operating bearing areas to brace the shell against distortion and damage.

Other objects and advantages of the invention will more fully and clearly appear from the description and claims hereinafter following.

In the drawings, forming a part of the specification, Figure 1 is a longitudinal, horizontal, sectional view of a portion of a railway draft rigging, showing my improvements in connection therewith, the section through the friction elements corresponding to two intersecting planes at an angle of 120° to each other. Figure 2 is a front end elevational view of the shock absorbing mechanism proper. And Figures 3 and 4 are transverse, vertical, sectional views corresponding respectively to the lines 3—3 and 4—4 of Figure 1.

In said drawings, 10—10 indicate channel-shaped center or draft sills of a railway car underframe, to the inner surfaces of which are secured the usual front stop lugs 11—11 and rear stop lugs 12—12. The inner end of the drawbar is designated by 13 to which is operatively connected a yoke 14 of well known form. The shock absorbing mechanism proper, as well as a front main follower 15, is disposed within the yoke. The yoke and the parts contained therein are supported in operative position by a detachable saddle plate 16.

The improved shock absorbing mechanism proper, as shown, comprises broadly: A spring cage casting A; a friction shell B; a main wedge block C; three friction shoes D—D—E; a spring follower F; a central spring resistance element G; four outer spring resistance elements H; and a retainer bolt J.

The casing or spring cage casting A is of generally rectangular box-like form having horizontally disposed spaced top and bottom walls 17—17 vertically disposed, longitudinally extending spaced side walls 18—18, and a transverse rear end wall 19 co-operating with the stop lugs 12 in the manner of the usual rear follower. At the forward end, the spring cage is provided with an opening 20 of substantially rectangular outline, but of smaller area than the cross-sectional area of the interior of the spring cage. The side walls of the cage are reinforced by longitudinally extending ribs or flanges 21—21. The flange associated with each side wall 18 extends longitudinally thereof and is disposed substantially centrally between the top and bottom edges of the wall. As will be seen upon reference to Figure 3, the side walls of the opening 20 at the front end of the cage are provided with inwardly projecting central sections overlying the outer ends of the ribs 21 and formed integral therewith. The top and bottom walls 17 are longitudinally recessed at opposite sides on the inner surfaces thereof as indicated at 22—22, thereby providing concave seats for the corresponding sides of the springs H. At the forward end, the spring cage is provided with a pair of inwardly extending vertically disposed overhanging flanges 23—23, the flanges 23 being spaced outwardly from the front end face of the spring cage casting proper, thereby providing vertical grooves or recesses adapted to accommodate connecting means on the inner end of the friction shell hereinafter more fully described.

The friction shell B is of substantially cylindrical form and has opposed laterally projecting flanges 25—25 at the rear end thereof, the rear walls of the flanges being flush with the rear end of the shell as most clearly shown in Figure 1. The flanges 25 are adapted to be inserted between the flanges 23 and the front face of the spring cage casting and snugly fit the opening therebetween. It will be evident that the friction shell B is positively held against longitudinal movement with reference to the spring cage by the interengaging flanges. The friction shell is provided with three interior, true cylindrical friction surfaces 26—26 converging inwardly of the mechanism.

The main wedge block C is in the form of a cored casting having a flat front end face bearing on the inner surface of the main follower 15. At the inner end, the wedge block C is provided with three rearwardly converging wedge faces 27—27 and 28. The two wedge faces 27 are disposed at relatively blunt non-wedge-acting angle with respect to the longitudinal axis of the mechanism while the wedge face 28 is disposed at a relatively keen wedge-acting angle with reference to said axis.

The friction shoes D, D and E are of similar design, except as hereinafter pointed out.

Each shoe is formed with an outer true cylindrical friction surface 126 adapted to co-operate with one of the friction surfaces 26 of the shell. Each shoe also has a wedge face on the inner side thereof, the wedge faces of the shoes D being designated by 127 and the wedge face of the shoe E being designated by 128. The wedge faces 127 of the two shoes D extend at a relatively blunt angle with respect to the longitudinal axis of the mechanism and co-operate with the faces 27 of the wedge block C, and the face 28 of the shoe E extends at a relatively keen wedge-acting angle with reference to the axis of the mechanism and co-operates with the wedge face 28 of the block C. The wedge faces of the shoes D, D and E are disposed on laterally inwardly extending enlargements of the shoes and the rear ends of the enlargements form abutment means for a spring follower disc 29 adapted to co-operate with the front end of the central spring resistance element G.

The main spring follower F is in the form of a substantially flat plate corresponding in outline to the contour of the opening 20 at the front end of the spring cage casting, the follower being slightly smaller than the opening so that it may be freely inserted through the same. The spring follower F is provided with a central opening 30 adapted to freely accommodate the front end of the spring resistance element G which extends therethrough. The opening 30 as most clearly shown in Figure 1, is surrounded by an annular forwardly projecting rib or flange adapted to engage within the rear end of the friction shell B, thereby holding the same assembled with the spring cage by preventing relative lateral movement of the shell and cage.

The spring resistance means which opposes inward movement of the friction system comprising the friction shoes D, D and E and the main wedge C, is disposed within the spring cage and comprises a centrally disposed spring element G and four spring elements H surrounding the same. The central spring element G is appreciably longer than the remaining spring elements H and is also heavier than the same. The spring resistance element G has its opposite ends bearing respectively on a hollow boss projecting inwardly from the rear wall 19 of the spring cage casting and the spring follower disc 29. The spring elements H are arranged in pairs at opposite sides of the central spring resistance element, the members of each pair being disposed on opposite sides of the rib 21 on the corresponding side wall of the spring cage. The top and bottom sides of the coils of the spring elements of each pair are accommodated within the concave seats 22 on the top and bottom walls of the casing on the same side of the mechanism. The spring elements H bear at their opposite ends on the rear end wall 19 of the spring cage casting and the inner side of the spring follower F. Upon reference to Figure 4, it will be seen that by the arrangement of the five springs provided, that substantially the entire available spring space of the cage is occupied. With this arrangement of five springs, a spring capacity equal to or greater than that of the best type of twin spring arrangement of friction gear now employed is had. Due to this arrangement also the spring space of the spring cage casting may be reduced to such an extent over what has been the practice in the twin arranged spring type as to permit solid side walls being used on the cage, thereby greatly adding to the column strength of the cage. It will further be evident that with the arrangement of five springs, the four outer springs may be disposed within the shell before the central spring is assembled therewith, and that the spring resistance elements may therefore be entered through the opening at the front end of the cage even though this opening is of smaller area than the cross-sectional area of the spring space of the cage. By providing the relatively smaller opening at the front end of the cage, a relatively large front abutment surface is provided on the cage forming a substantial support for the inner end of the friction shell.

The retainer bolt has its opposite ends anchored to the hollow boss on the end wall 19 and the wedge block C. The shank of the bolt extends through the coil G, the main spring follower F and the spring follower disc 29. The retainer bolt J in addition to holding the mechanism assembled, also maintains the same of overall uniform length and may be adjusted to obtain the proper overall length of the gear. In this connection, it is pointed out that inasmuch as the retainer bolt J has its opposite ends anchored to the end wall of the shell and the wedge block C, the overall length of the mechanism is not affected to any extent, due to upsetting of the spring cage by the heavy blows to which the gear is subjected during service.

The use of the central spring element which extends through the spring follower eliminates the employment of the relatively weak preliminary springs heretofore used in gears of this type between the friction system and the spring follower. Through this arrangement of springs, it is also possible to maintain the assembly of the gear at constant overall length and take care of any slack induced by wear of the parts. High capacity is also obtained due to the use of the single central spring in place of the usual arrangement of springs with the auxiliary spring interposed between the spring follower and the friction system. The mechanism is assembled as follows: The four springs H are first inserted through the front end of the cage and disposed in proper position at opposite sides of the mechanism. The spring follower F is then placed in position and the mechanism compressed sufficiently to apply the flanges 25 of the friction shell to the spring cage, the flanges 25 being inserted between the flanges 23 and the front end proper of the cage. The pressure is then removed and the friction cylinder is forced into its proper position, the spring follower F engaging within the inner end of the cylinder as soon as the opening of the latter comes into alinement with the annular flange at the front end of the spring follower. The remaining parts of the mechanism are then assembled, the spring G being inserted through the front end of the friction shell and passed through the opening 30 of the spring follower and the friction shoes and wedge blocks inserted in the friction shell and secured in position by the retainer bolt J. When the parts are thus assembled, the inner ends of the friction shoes are spaced slightly from the annular flange of the spring follower F as most clearly shown in Figure 1. This space is left to insure a wedging action being set up between the friction shoes and main wedge before the inner ends of the shoes come into engagement with the spring follower.

The operation of my improved shock absorbing mechanism, assuming a compression stroke, is as follows: The follower 15 and the casting A will be moved relatively toward each other, causing the wedge block C to be moved inwardly of the mechanism, forcing the friction shoes apart and pressing the same into intimate contact with the friction surfaces of the shell. During the continued inward movement of the wedge, the friction shoes will be carried inwardly of the shell until they engage the flange of the spring follower. During the action described, the spring element G only will be compressed, but as soon as the spring follower F is engaged by the friction shoes, the same will be forced inwardly also and all of the springs disposed within the cage, including the central spring G, will be compressed. The described action will continue either until the actuating force is reduced or until movement of the follower 15 is arrested by engagement with the outer end of the friction shell B. When the follower engages the end of the shell, the force will be transmitted directly through the shell and the casing to the corresponding stop lugs of the draft sills. As the casing side walls are solid and are further reinforced by longitudinally extending ribs 21, a column of unusually great strength is obtained.

When the actuating force is reduced, the springs G and H will return all the parts to normal position, outward movement of the wedge being limited by engagement with the retainer bolt, thereby limiting the outward movement of the friction shoes and the expansion of the spring G. Outward movement of the spring follower will be limited by engagement with the inner end of the friction shell. It is further pointed out that by the employment of the blunt and keen wedge faces on the wedge block and friction shoes, a relatively high wedging action will be produced during compression of the mechanism due to the keen wedge faces and release of the parts will be assured through the blunt wedge faces. In this connection, it will be understood that my improvements are capable of use in mechanism either employing the blunt and keen angle system of wedge faces or wedge faces which are all of the same angle with respect to the axis of the mechanism.

From the preceding description taken in connection with the drawings, it will be evident that I have provided a gear of exceedingly simple construction, which may be easily assembled and which has unusually great column strength. By so designing the spring casing that the component parts of the mechanism, including the spring resistance elements and the spring follower may be entered through the front end of the casing, there is no necessity for leaving the side walls of the casing open as has heretofore been the practice in gears of this general type, thus leaving all the walls intact and materially adding to the column strength of the casing or cage. By the spring arrangement employed, a large diameter central spring and four smaller diameter springs, a spring unit of exceptional high capacity is obtained. As the column section follows the outside contour of the outer springs, the wall arrangement of the cage is such that continuous metal is disposed directly at the three regions of meeting edges of the friction shoes, thereby preventing a beam action of the shell and bracing the cylinder at the rear end thereof. Another advantage of my design is that the flange which connects the friction shell to the spring cage is disposed at the extreme end of the shell, thereby greatly strengthening the latter against bursting stress and strain developed at this point.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage open at one end; of a unitary friction shell;

means for detachably connecting the shell to the cage including means for holding the shell and cage against movement relatively to each other longitudinally of the mechanism; a friction wedge system co-operating with the friction shell said system including friction shoes; a spring follower within the cage, said spring follower having a portion normally projecting into the shell to hold the same against lateral displacement with respect to the cage and a spring resistance within the cage, said spring resistance being insertible through the open end of the cage, said spring resistance including a plurality of elements bearing on the spring follower and a relatively heavy spring element disposed centrally of the cage and extending through the spring follower, co-operating directly with the shoes and holding the latter normally spaced from the spring follower.

2. In a friction shock absorbing mechanism, the combination with a hollow spring cage casting open at one end, all of the walls of said cage being solid and continuous, the hollow portion of said cage providing a spring space, said opening of the cage being of less area than the cross sectional area of the spring space thereof, whereby an end abutment face is provided, said cage being provided with overhanging flanges at the open end thereof; of a friction shell having an end flange adapted to be inserted between the end abutment face and the overhanging flanges of the cage for detachably connecting the shell to the cage; spring resistance means occupying substantially the entire spring space of the cage, said spring resistance including a plurality of elements insertible through the open end of the cage; and a friction system co-operating with the shell.

3. In a friction shock absorbing mechanism, the combination with a spring cage casting having solid continuous top, bottom, and side walls, and an end wall, said cage being open at one end; of a detachable friction shell; a friction wedge system co-operating with the shell, said system including a wedge member; a spring follower within the cage and co-operating with the friction system; a plurality of spring resistance elements within the cage, including a central spring element extending through the spring follower and directly engaging the friction system; a plurality of springs bearing on the spring follower, all of said springs being insertible through the open end of the cage; and a retainer bolt anchored to the wedge member and the end wall of the cage, said retainer bolt extending through the spring follower.

4. In a friction shock absorbing mechanism, the combination with a spring cage open at one end; of means detachably secured to the open end of the cage presenting interior friction surfaces extending lengthwise of the mechanism; friction shoes co-operating with said friction surfaces; a pressure transmitting member having wedging engagement with the shoes; spring resistance means within the cage, said spring resistance means being composed of a plurality of members including a central coil; a spring follower through which said central coil extends, said spring follower being interposed between the shoes and the remaining members of said spring resistance, said central coil opposing inward movement of the shoes independently of said remaining members of the spring resistance.

5. In a friction shock absorbing mechanism, the combination with a spring cage open at one end; of means detachably secured to the open end of the cage presenting interior friction surfaces extending longitudinally of the mechanism; friction means including friction shoes co-operating with the said friction surfaces; a spring follower co-operating with the shoes; spring resistance means within the cage, said spring resistance means opposing inward movement of the spring follower and shoes; and an additional spring resistance also opposing inward movement of the shoes, said additional spring resistance having one end thereof extending through the spring follower and outwardly beyond the same and co-operating with the friction shoes.

6. In a friction shock absorbing mechanism, the combination with a spring cage open at one end; of means detachably secured to the cage at the open end thereof presenting interior friction surfaces extending lengthwise of the mechanism; friction shoes co-operating with said friction surfaces, wedge pressure transmitting members co-operating with the shoes; spring resistance means within the cage; spring follower means interposed between the shoes and said spring resistance means, said spring follower having shouldered engagement with the first named means to limit outward movement of the spring follower; and an additional spring resistance element within the spring cage, said element having a section thereof extending through the spring follower and co-operating with the shoes to oppose inward movement thereof.

7. In a friction shock absorbing mechanism, the combination with a spring cage casting having solid continuous top, bottom and side walls and an end wall, said cage being open at one end; of detachable friction means secured to the cage at the open end thereof; a friction wedge system co-operating with the friction means, said system including a wedge member and friction shoes; a spring follower within the cage and co-operating with the friction system; a central spring element extending through the spring follower and directly engaging the friction system; a plurality of springs disposed about said central element and bearing directly on the spring follower, all of said springs and said spring element being insertable through the open end of the cage; and retaining means for anchoring the wedge member to the cage.

In witness that I claim the foregoing I have hereunto subscribed my name this 9th day of July, 1926.

GOODRICH Q. LEWIS.